March 9, 1971  J. H. VAN LOENEN  3,568,456
METHOD FOR MANUFACTURING LONG PIPE LINES ON THE
BOTTOM OF A DEEP WATER
Filed Dec. 23, 1968
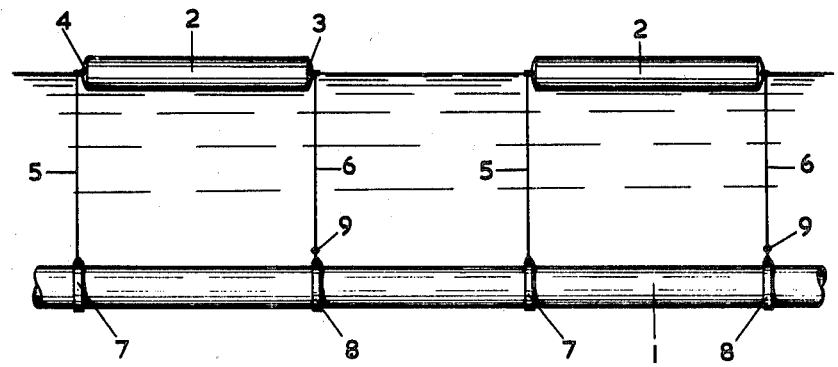
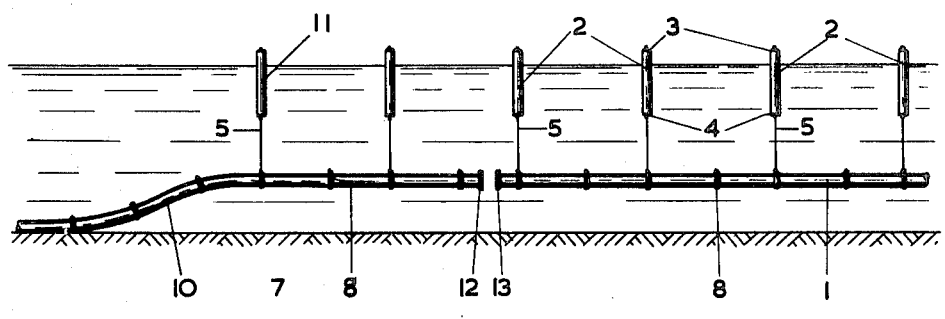

United States Patent Office 3,568,456
Patented Mar. 9, 1971

3,568,456
METHOD FOR MANUFACTURING LONG PIPE LINES ON THE BOTTOM OF A DEEP WATER
Jan Hendrik van Loenen, Beverwyk, Netherlands, assignor to Netherlands Offshore Company N.V., The Hague, Netherlands
Filed Dec. 23, 1968, Ser. No. 786,164
Claims priority, application Great Britain, Dec. 29, 1967, 59,136/67
Int. Cl. F16l 1/00; B63b 35/42
U.S. Cl. 61—72.6
2 Claims

ABSTRACT OF THE DISCLOSURE

The present invention relates to a method of manufacturing long pipe lines on the bottom of a deep water, such as the sea bottom, according to this method the pipe line sections are prefabricated in a length of half a mile or more and subsequently transported towards the destination by supporting the sections deep below water level by means of a number of vertical floats spaced at regular intervals over the length of the sections. When in place the floats will intersect the water level with a relatively small cross section.

---

The present invention relates to a method of manufacturing a long pipe line on the bottom of deep water, such as the sea bottom, in which prefabricated pipe line sections are connected with a previously laid pipe line portion. It is well known to manufacture long pipe lines of this kind by means of special vessels which support the front end of the pipe line and upon which new sections are connected to the front end. The ship is moved a certain distance after each added section of the pipe line with a new section of the pipe line being supported at the back side of the ship by means of a guiding structure and extending towards the bottom according to a curved line. In water which is relatively quiet there are no difficulties, but in a rough sea this is difficult due to the continuous movements of the ship, which movements results in longitudinal tensions and bending stresses in the material of the pipe line. For short pipe lines such as pipe lines which have to cross a river, it is known to manufacture the pipe line in great length on the shore and to tow it over the bottom of the river by means of special winches. With great length this, however, cannot be done due to the increased resistance.

Purpose of the invention is the provision of a method of manufacturing a long pipe line in which the difficulties due to the movements of the waves are overcome as much as possible.

According to the invention this purpose has been achieved by prefabricating the pipe line sections in great length e.g. of half a mile or more, which sections are transported towards the destination by supporting the sections below water level on a number of vertical floats spaced at regular intervals over the length of the sections e.g. by means of cables, where the floats at the intersection of the water level have a small cross section. Accordingly long pipe line sections are assembled and the sections are transported towards their destination deep below the water level which provides quiet water. The pipe line is supported by means of floats which are undisturbed or at least hardly affected by the waves. At their destination, the long pipe line sections are connected with the front end of the already manufactured pipe line still supported at the same depth. After this coupling a number of the floats are released and the pipe line may further lie down on the bottom. The new forward end of the pipeline, however, is still kept at the correct level by maintaining a sufficient number of floats.

The prefabrication of the long pipe line sections as a rule will take place close to shallow water such as the mouth of a river, or a harbour. To solve the problem of the initial transportation in this shallow water the floats according to the invention may be connected with the pipe line section at both ends such that the floats are horizontal, the connection of the upper end of each float with the pipe line section being released when sufficiently deep water is reached. This can be done with special cable sleeves which are loosened or by means of explosive bolts. Preferably care is taken that the release takes place according to a program such that the pipe line section is lowered progressively from one end to the other to avoid great mass forces during the lowering of the pipe line section. The floats which in the beginning in view of the water being shallow are horizontal, after the release of the upper end will turn into a vertical position due to which the pipe line section will automatically sink to a greater depth.

The floats which may be used in applying the method according to the invention may be of the bottle type which means that below water level they have a greater cross section than the small part intersecting the water level.

It is also possible to perform the floats over their entire height (or length as seen horizontally) with the same cross section e.g. by making the floats cylindrical, further the floats can be provided with means of controling their draught such as ballast tanks and pumps. The form of the floats with equal cross section throughout their height or length is suitable in particular for controlling the draught in a simple way. With long cylinders the pipe line section in the beginning may be supported at a small distance below the water level so that transportation can start in shallow water. In deep water the pipe line sections can easily be brought to the desired depth with or without partly ballasting the floats. The fixed draughts of the pipe line section is secured by the small cross section intersecting the water level. The wave movements then hardly can change the position of the floats and accordingly of the pipe line section.

When the pipe line section has been towed to the destination which section may have a length of one or one and a half miles then a connection with the front end of the pipe line already placed can be performed with the help of divers or by means of specially designed apparatus. As soon as the connection has been done the pipe line is lowered further the new front end being kept at the desired level to enable the connection with a next section. At locations where horizontal flows occur one also will perform a coupling of the pipe line section with anchored barges to be able to bring the pipe line section horizontally in line with the already placed pipe line and to control the lowering onto the bottom of the pipe line correctly. This manner of control has resemblance with the control of lowering a willow matting.

The invention now will be further elucidated with reference to the drawings:

FIG. 1 shows a pipe line section connected with horizontally located floats.

FIG. 2 shows the floats in a vertical position.

The pipe line section 1 shown in FIG. 1 has been supported on floats 2 having the form of longitudinal cylinders the lower end 3 and the upper end 4 of which each being connected with clamps or bails 7 or 8 respectively mounted around the pipe line section 1. The cable 6 has been connected with the bail 8 by means of an explosive bolt 9. If this connection is broken the section 1 only is supported by the cable 5 and the float 2 will turn into a vertical position. This situation has been shown in FIG. 2.

FIG. 2 shows a pipe line section 1 supported by means of the cables 5 on floats 2 which are now in the vertical position. The end of the allready placed pipe line 10 is kept at the level corect for the connection with the section 1 approaching it by means of floats 11 which are equal to the floats 2.

As soon as the connection of the flanges 12 and 13 or of other connecting members has taken place a number of connecting cables of the pipe line with the floats will be loosened so that the pipe line 10 with a portion of the section 1 connected to it may further lie down upon the bottom.

Having described my invention, I claim:

1. A method of laying a continuous submarine pipeline by connecting relatively long sections of pipe which have been floated to the situs of the pipeline to previously laid pipe sections comprising the steps of;

assembling in shallow water, pipe lengths into a relatively long pipe section, connecting both ends of floats to the pipe section while, in shallow water, the floats having predetermined lengths greater than their widths, to suspend the pipe section at a first position close to the water surface when both ends of the floats are connected to the pipe section and the floats' longitudinal axis is parallel to the pipe section, the floats being of such dimensions and buoyancy that they are capable of buoyantly supporting the pipe section at a second position in the water below the first opsition and safe from commercial surface traffic when the floats are connected at only one end to the pipe section, and the floats' longitudinal axis is perpendicular to the pipe section, floating the pipe section into water deep enough to permit the pipe section to assume the second position, releasing the connection between one end of each float and the pipe section to permit the pipe section to assume the second position, floating the pipe section in the second position to the situs of the pipeline, connecting the pipe section to previously laid pipe sections, releasing the connection of the other end of some of the floats to a portion of the pipe section to permit it to assume its final position under the water.

2. A method of laying submarine pipeline according to claim 1, wherein the connection between one end of each float and the pipe section is released by exploding a bolt connector so that the pipe section assumes the second position.

References Cited

UNITED STATES PATENTS

| 2,770,950 | 11/1956 | Collins | 61—72.3 |
| 3,262,275 | 7/1966 | Perret | 61—72.3 |

FOREIGN PATENTS

| 1,427,898 | 1/1966 | France | 61—72.3 |
| 647,739 | 10/1962 | Italy | 61—72.3 |

OTHER REFERENCES

Construction Methods and Equipment of June 1958, page 101.

JACOB SHAPIRO, Primary Examiner

U.S. Cl. X.R.

114—.5